United States Patent [19]
Suzuki et al.

[11] Patent Number: 5,784,401
[45] Date of Patent: Jul. 21, 1998

[54] TEMPERATURE DISTRIBUTION MEASUREMENT METHODS AND APPARATUS

[75] Inventors: Yoshihiko Suzuki, Funabashi; Katsushi Nakano, Kawasaki, both of Japan

[73] Assignee: Nikon Corporation, Tokyo, Japan

[21] Appl. No.: 747,784

[22] Filed: Nov. 14, 1996

[30] Foreign Application Priority Data

Dec. 5, 1995 [JP] Japan ................. 7-316188

[51] Int. Cl.⁶ .................. G01K 1/16; G01K 3/06; G01K 7/04
[52] U.S. Cl. .................. 374/137; 374/120; 374/179
[58] Field of Search .................. 374/137, 120, 374/179, 180; 136/230

[56] References Cited

U.S. PATENT DOCUMENTS

| | | | |
|---|---|---|---|
| 3,084,986 | 4/1963 | Schoneck | 374/180 |
| 4,046,009 | 9/1977 | Sauer | 374/180 |
| 4,483,631 | 11/1984 | Kydd | 374/180 |
| 4,708,495 | 11/1987 | Kitzinger et al. | 374/180 |
| 5,441,344 | 8/1995 | Cook, III | 374/180 |

FOREIGN PATENT DOCUMENTS

| | | | |
|---|---|---|---|
| 3838077 | 10/1989 | Germany | 374/180 |
| 1078131 | 8/1967 | United Kingdom | 374/179 |

*Primary Examiner*—Diego F. F. Gutierrez
*Attorney, Agent, or Firm*—Klarquist Sparkman Campbell Leigh & Whinston, LLP

[57] ABSTRACT

Methods and apparatus are disclosed for measuring the temperature distribution or profile of a specimen at high resolution. An apparatus comprises a thin-film membrane formed of a first thermo-electrically conductive material, the membrane having a first major surface for holding the specimen. The apparatus also comprises a probe having a tip radius operable to contact a second major surface of the membrane opposite the first major surface. The tip radius comprises a second thermo-electrically conductive material that is different from the first thermo-electrically conductive material so as to generate, by the Seebeck effect, a thermo-electromotive force (TEMF) between the tip radius and the thin-film membrane. The probe can be scanned across the second major surface; the TEMF can be measured, processed, and displayed to produce a temperature profile of the specimen.

16 Claims, 3 Drawing Sheets

TEMPERATURE DISTRIBUTION MEASUREMENT METHODS AND APPARATUS

FIELD OF THE INVENTION

This invention pertains to methods and apparatus for measuring temperature-distribution profiles. More specifically, the invention pertains to methods and apparatus for obtaining temperature-distribution profiles of small specimens at high resolution.

BACKGROUND OF THE INVENTION

In the past, the temperature profile of a minute specimen, such as (but not limited to) a biological specimen (e.g., bacterium; hereinafter referred to simply as the "specimen"), was obtained by sensing infrared light emitted by the specimen using a photo-electric transducer such as a CCD or the like; analyzing the electrical signals, by microcomputer or the like, produced by the transducer in response to the infrared light; and converting the signals into a video image.

Since the wavelength of infrared light (about 3 µm) is longer than the wavelength of visible light, prior-art temperature distribution measurement methods and apparatus exhibit resolution problems. For example, prior-art methods and apparatus are unable to detect temperature distributions with a better resolution than obtainable with an optical microscope that utilizes visible light. More specifically, the best temperature profiles obtained according to the prior art exhibit a resolution of about 2 µm. Thus, it is difficult according to the prior art to measure the temperature distribution of a minute specimen (e.g., a biological specimen having dimensions of 10 µm by 5 µm with a satisfactory resolution (e.g., a resolution of 1 µm or less).

SUMMARY OF THE INVENTION

The present invention addresses the foregoing problems. A key object of the present invention is to provide methods and apparatus for measuring the temperature profile of minute specimens with higher resolution than prior-art methods and apparatus.

To such end, temperature-profile measurement methods and apparatus are provided according to the present invention. According to a preferred embodiment of a method, a thin-film membrane is made from a first thermo-electrically conductive material. The thin-film membrane is preferably mounted on a specimen holder. A specimen is placed on a first major surface of the thinfilm membrane. The second major surface, opposite the first major surface, of the thin-film membrane is contact-scanned using a probe. The probe comprises a small tip radius (the probe is preferably configured similarly to a probe used in atomic force microscopy) that contacts the second major surface. The probe is made of a second thermo-electrically conductive material that is different from the first thermo-electrically conductive material. The temperature profile of the specimen is obtained by measuring the thermo-electromotive force (TEMF) generated at the point of contact between the thin-film membrane and the probe for all points on the second major surface located beneath the specimen, wherein the TEMF is a function of temperature.

According to a preferred embodiment, an apparatus according to the present invention comprises a specimen holder comprising a thin-film membrane formed from a first thermo-electrically conductive material. The thin-film membrane is operable to hold the specimen on a first major surface of the membrane. The apparatus also comprises a probe having a small tip radius and being formed of a second thermo-electrically conductive material that is different from the first thermo-electrically conductive material. The probe preferably has a cantilevered configuration similar to that used in atomic force microscopy (AFM). The tip of the probe is adapted to contact a second major surface of the thin-film membrane opposite the first major surface. The apparatus also comprises a probe actuator for moving the probe, while the probe tip remains in contact with the second major surface, to "scan" the secondary surface in a raster fashion and obtain a temperature profile of the secondary surface as affected by features of the specimen. The apparatus also preferably comprises an environment controller operable to control the environment of the first major surface of the thin-film membrane and any specimen resting thereon. Finally, the apparatus preferably comprises circuitry for obtaining, from signals generated by the probe, local measurements of the TEMF generated between the probe tip and the second major surface of the thin-film membrane.

The foregoing and additional features and advantages of the present invention will be more readily apparent from the following detailed description, which proceeds with reference to the accompanying drawings.

DETAILED DESCRIPTION

Figure 1:
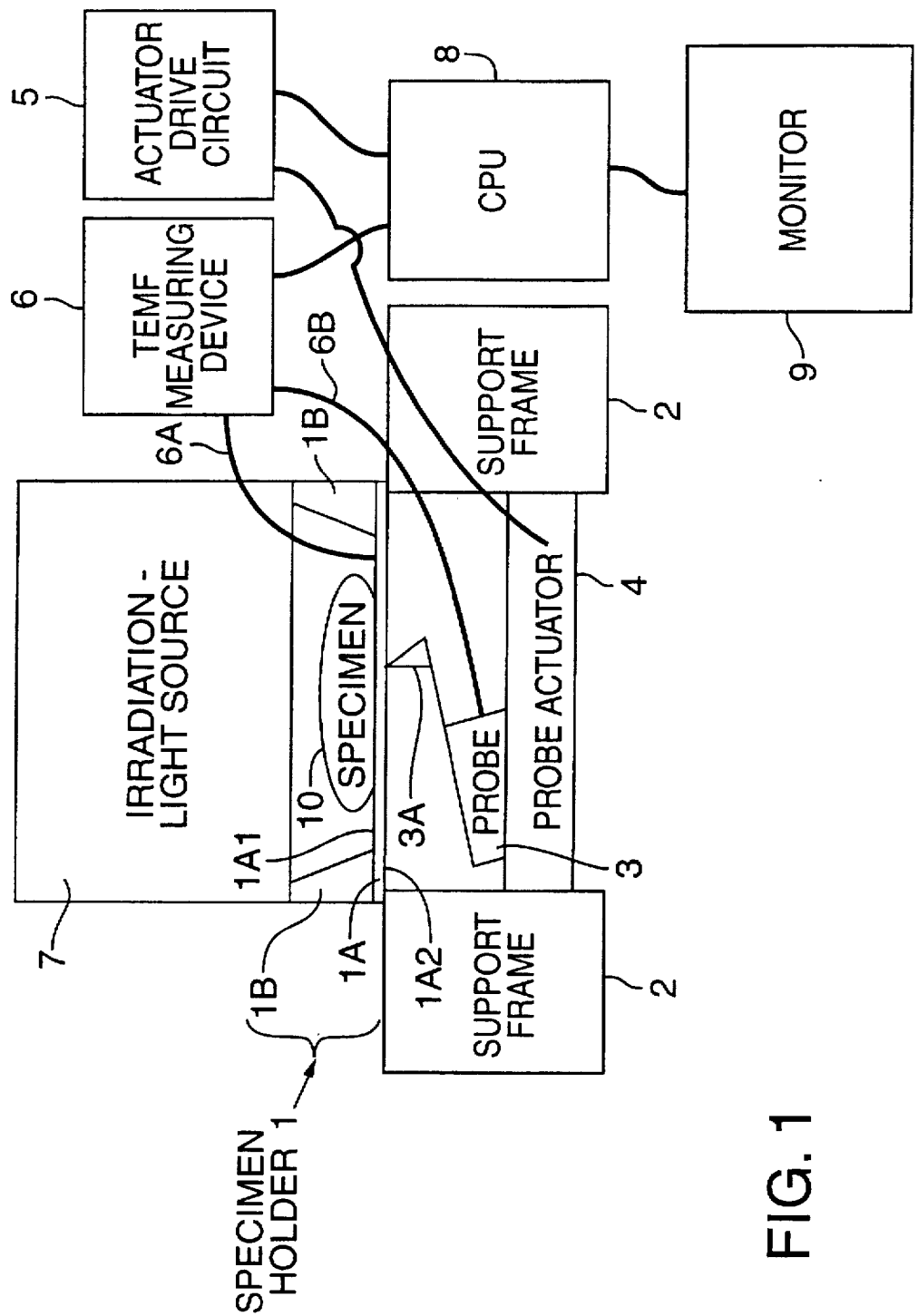
FIG. 1 shows in block-schematic form the principal components of a preferred embodiment of an apparatus according to the present invention and the interconnections between the components.
Figure 2A:
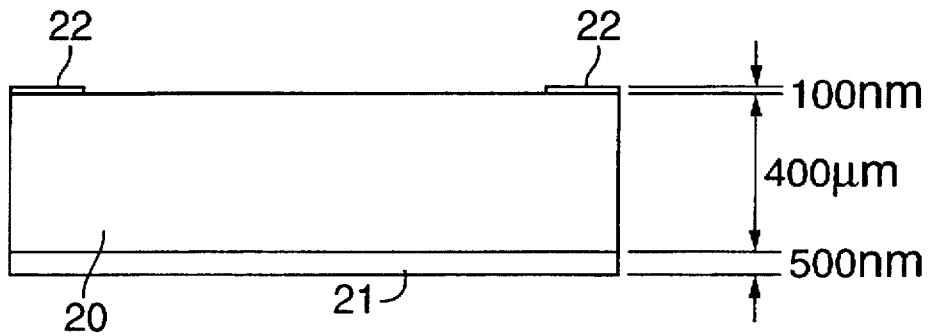
FIGS. 2(a)–2(b) are cross-sectional drawings showing the fabrication of a representative specimen holder 1 as used in the FIG. 1 embodiment.

A preferred embodiment of an apparatus according to the present invention is shown in FIG. 1, which also illustrates key aspects of a preferred embodiment of a method according to the invention. The apparatus comprises a specimen holder 1, a support frame 2, and a probe 3. The specimen holder 1 comprises a thin-film membrane 1A and membrane support 1B (refer to FIG. 2, discussed below, for details on the construction of the specimen holder 1). The thin-film membrane has a first major surface 1A1 and a second major surface 1A2. The specimen holder 1 is supported, around the perimeter of the thin-film membrane 1A, by a support frame 2. An irradiation-light source 7 (also termed herein an "environment controller") is situated above the thin-film membrane 1A which is supported by the membrane support 1B. Thus, a desired intensity of light is irradiated onto the specimen 10 placed on the first major surface 1A1 of the thin-film membrane 1A. The probe 3 has a probe tip 3A that contacts the second major surface 1A2.

The probe 3 is operable to scan across the second major surface 1A2 and sense the temperature profile of the specimen resting on the first major surface 1A1. The probe 3 comprises a thermo-electrically conductive material of a different type from that of the thin-film membrane 1A (as discussed further below). The probe tip 3A has a very small tip radius (typically several nm, preferably similar to a probe as used for an atomic-force microscopy (AFM)). The probe tip 3A preferably has a cantilever configuration as shown.

A probe actuator 4 is operable to move the probe 3 while the probe tip 3A remains in contact with the second major surface 1A2 of the thin-film membrane 1A, thereby allowing the probe tip 3A to "scan" over the second major surface such as in a raster fashion. An actuator-drive circuit 5, connected to the probe actuator 4, is operable to cause the probe actuator 4 to move according to commands from a microcomputer 8.

A thermo-electromotive force (TEMF) measurement device 6 is connected to the thin-film membrane 1A by a first electrical cable 6A, and is connected to the cantilever-probe 3 by a second electrical cable 6B. The TEMF measurement device 6 is operable to measure the temperature-dependent TEMF (discussed below) generated at the point of contact of the probe tip 3A with the thin-film membrane 1A, and outputs the measured values to the microcomputer 8.

The microcomputer 8 is operable to display the TEMF measured by the TEMF measurement device 6 on a monitor 9 or other suitable display.

Further according to the preferred embodiment, the specimen holder 1 is configured such that the thinfilm membrane 1A and the membrane support 1B are separate components. Fabrication of such a specimen holder 1 is preferably performed as follows (referring to FIG. 2): First, a film of a suitable thermo-electrically conductive material 21 (e.g., nichrome, titanium, aluminum, etc.; thickness about 500 nm, for example) that can be formed by a thin-film formation method ( ) is formed over the entire bottom surface of, preferably, a 3-inch diameter×400-μm thick silicon substrate 20. A silicon nitride film 22 (e.g., 100-nm thick) is formed over the entire top surface of the silicon substrate 20. Using a photo-resist (not shown), the perimeter regions of the silicon nitride film 22 are protected; the central region of the silicon nitride film 22 is dry-etched away to form an opening at the central region and thus expose the underlying silicon substrate 20 (FIG. 2(a)).

Figure 2B:
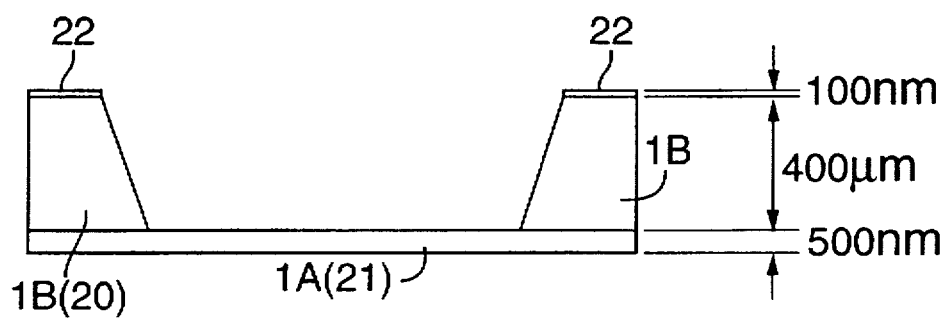

A wet-etching process, using KOH or TMAH, for example, is then performed on the top surface of the silicon substrate 20 to remove unprotected silicon, as shown in FIG. 2(b). This leaves the film of first thermo-electrically conductive material 21 spanning across the void created by removal of silicon (FIG. 2(b)). The remaining silicon 20 provides a membrane support 1B. The remaining silicon nitride film 22 is preferably removed after the wet etching step is completed.

A probe 3 comprises a second thermo-electrically conductive material that is different from the first thermo-electrically conductive material of the thin-film membrane 1A. For example, if the first thin-film membrane 1A is formed of aluminum, then the second thermo-electrically conductive material is a material other than aluminum (e.g., nichrome). Whereas the probe 3 can be made entirely of the second thermo-electrically conductive material, it can alternatively be made of another suitable material that is coated with the second thermo-electrically conductive material.

Figure 3:
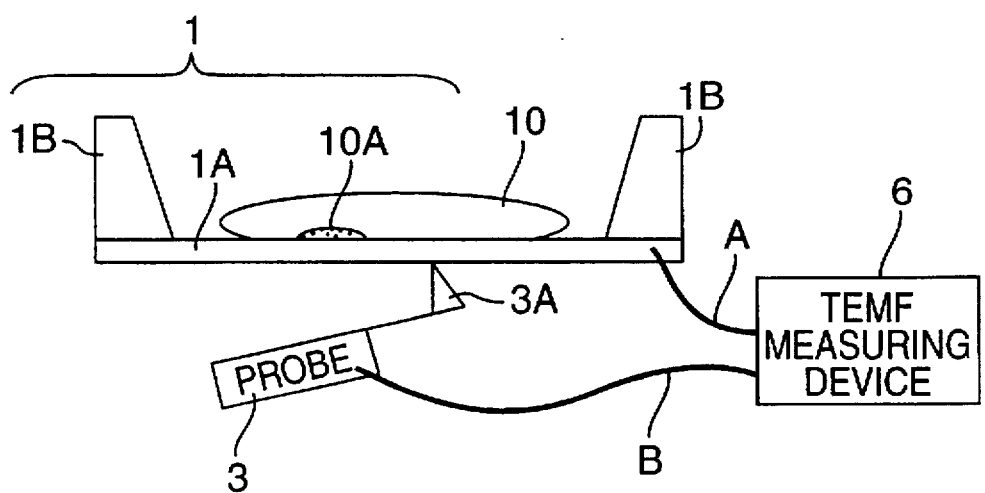
FIG. 3 shows certain key aspects concerning operation of a probe of the type used in the FIG. 1 embodiment.

Turning now to operation of the temperature-profile measurement apparatus, reference is made to FIG. 3, in which, for simplicity, the support frame 2, the probe actuator 4, the actuator-drive circuit 5, the irradiation-light source 7, the microcomputer 8, and the monitor 9 have been omitted.

The irradiation-light source 7 produces a wavelength of light sufficient to generate a temperature distribution in the specimen 10, i.e., to differentially heat various structures of the specimen. As a result of such irradiation, a portion of the specimen (termed herein an exothermic locus 10A) will undergo differential heating relative to other portions of the specimen. Because the thin-film membrane 1A on which the specimen 10 is placed is very thin (e.g. 500 nm thick), the thin-film membrane 1A has a very small thermal capacity. Consequently, the local heat generated, for example, in the exothermic locus 10A is rapidly transmitted through the thin-film membrane 1A. Any heat generated at locations other than the exothermic locus 10A in the specimen 10 is also transmitted from those locations through the thin-film membrane 1A. These effects generate a temperature distribution or profile across the second major surface 1A2 of the thin-film membrane 1A.

The microcomputer 8 controls operation of the actuator-drive circuit 5 driving the probe actuator 4. As a result, the probe 3 is moved by the probe actuator 4 so as to "scan" over the second major surface 1A2 of the thin-film membrane 1A, such as in a raster fashion, while the probe tip 3A remains in contact with the second major surface 1A2.

According to the Seebeck effect, a thermo-electromotive force (TEMF) is generated by the temperature differences between junctions in a circuit containing two different thermo-electrically conductive metals or alloys. This is the phenomenon on which thermocouples are based. In FIG. 3, the thin-film membrane 1A is made of the first thermo-electrically conductive material, and the probe 3 comprises the second thermo-electrically conductive material. The point of contact of the probe tip 3A with the second major surface of the thin-film membrane 1A forms a thermocouple at which a TEMF is generated. The TEMF-measurement device 6 measures this TEMF.

In other words, the probe tip 3A on the cantilever 3 can scan the second major surface of the thin-film membrane 1A, and the TEMF-measurement device 6 measures the TEMF at each point of contact, wherein the TEMF at each such point is a function of temperature at the point. The resulting TEMF profile corresponds to the temperature distribution or profile of the thin-film membrane 1A which, in turn, reflects the temperature distribution of the specimen 10. The TEMF value at each scanned point on the thin-film membrane 1A as measured by the TEMF-measurement device 6 is output to the microcomputer 8.

The microcomputer 8 processes the TEMF values for display, as for example, numbers or a video image on the monitor 9.

Since the temperature profile resulting from light absorption by the specimen 10 is measured by contact-scanning the respective surface of the thin-film membrane 1A with the probe tip 3A having a small tip radius (several nm) to detect the generation of TEMF caused by the Seebeck effect, that temperature profile can be measured at a sufficient resolution relative to the size of the specimen (especially minute biological specimens) placed on the thin film membrane 1A. That resolution typically corresponds to the diameter of the probe tip 3A.

In addition, since a temperature difference can occur between locations on the thin-film membrane 1A not occupied by the specimen 10 versus locations occupied by the specimen, the surface shape of the specimen 10 can be profiled in this manner. Furthermore, for example, if the exothermic locus 10A in the specimen 10 is a pigment that produces heat when irradiated by light, it is possible to detect the position of the pigment in the specimen at the same time that the specimen's surface shape is being detected.

Figure 4:
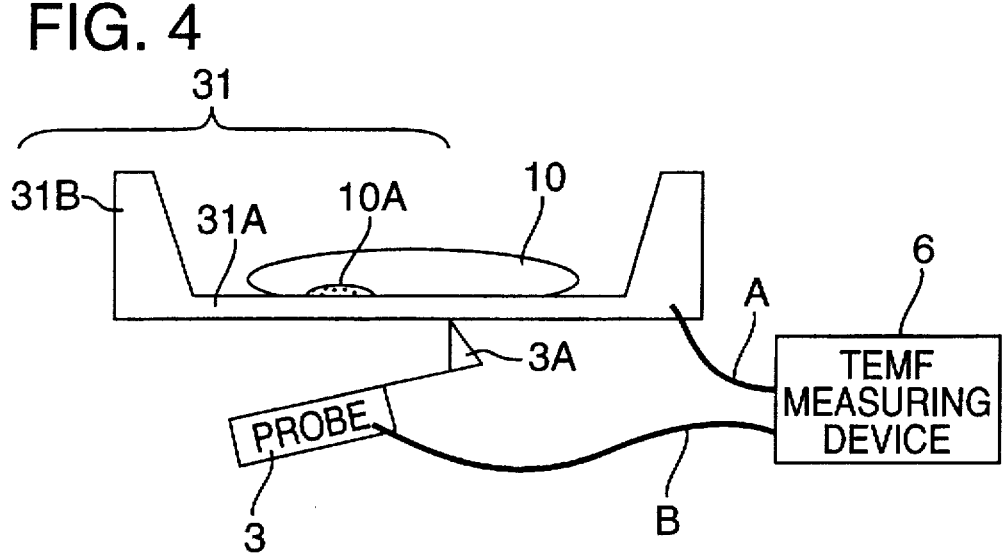
FIG. 4 is a side elevational schematic view showing certain aspects of an alternative embodiment of a specimen holder and probe.
Figure 5A:
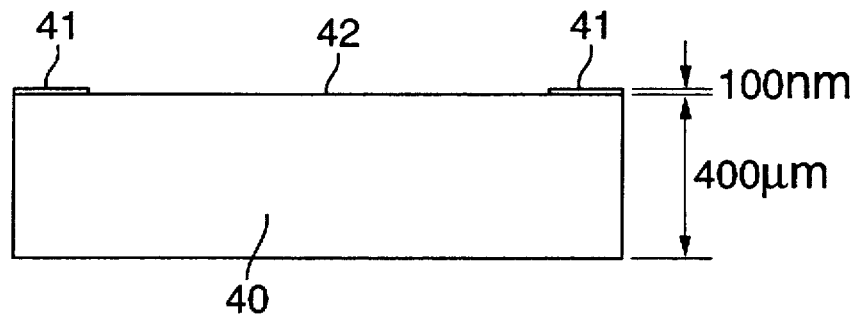
FIGS. 5(a)–5(b) are cross-sectional drawings showing the fabrication of the specimen holder of FIG. 4.
Figure 5B:
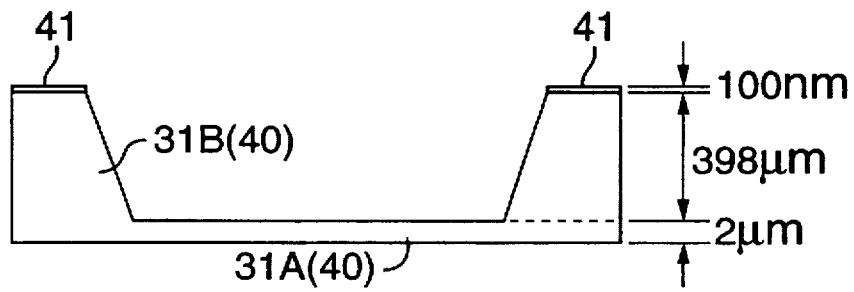

In the preferred embodiment, the thin-film membrane 1A and the membrane support 1B are formed of different materials. Alternatively, the thin-film membrane and the membrane support can be formed as a single unit from the same thermo-electrically conductive material. Such a scheme is illustrated in FIGS. 4 and 5(a)–5(b). In FIG. 4, for the sake of simplicity, the support frame 2, probe actuator 4, actuator-drive circuit 5, irradiation-light source 7, microcomputer 8, and monitor 9 have been omitted. Since it is necessary that the thin-film membrane 31A be a thermo-electrically conductive member, the support 31B is formed of the same thermo-electrically conductive material as the thin-film membrane 31A.

The specimen holder 31 of the FIG. 4 embodiment is fabricated as diagrammed in FIGS. 5(a)–5(b). A (preferably) 100-nm thick silicon nitride film 41 is formed on the perimeter of the first major surface 42 of a (preferably) 400-μm thick silicon substrate 40 (formation method is the same as in FIG. 2(a)). A wet etching process, using KOH or TMAH for example, is performed to remove silicon from the first major surface 42, leaving a (preferably) 2-μm thick silicon membrane 31A, as shown in FIG. 5(b). Unlike FIG. 2(b) in which all material outside the area on which the silicon nitride film 22 was formed was removed, etching is carefully performed in FIG. 5(b) so as to leave a 2-μm thick thin-film membrane 31A of silicon.

In the FIG. 4 embodiment, it is necessary that the probe 3 be formed of a thermo-electrically conductive material other than silicon (e.g., aluminum).

In FIG. 4, all structures and operations that are identical to those shown in FIG. 1 have been omitted.

The irradiation-light source 7 can be operable to produce light continuously. Upon receiving light irradiation, the temperature of the exothermic locus 10a, for example, in the specimen 10 increases relative to other portions of the specimen and to the thin-film membrane. However, if the specimen were continuously irradiated, temperature differences at each location in the specimen 10 would rapidly equilibrate with surrounding structures, making it difficult to accurately detect a temperature profile with any degree of resolution. To prevent this problem, the specimen 10 is preferably illuminated in a pulsed manner. This can be done by rapidly switching the light source ON and OFF or by interposing a chopper or shutter between the light source and the specimen. In any event, during pulsed illumination, the probe 3 is scanned in synchrony with the pulses so as to allow detection of a substantially instantaneous distribution of TEMF at each pulse. Such a scheme suppresses averaging of the temperature distribution, allowing the temperature profile of the specimen 10 to be more accurately measured at high resolution.

The irradiation-light source 7 can also be made switchable so that all or only a portion of the specimen 10 is irradiated with light at any one time. The irradiation-light source can also be provided with a spectrometer to allow accurate adjustment of the wavelength of the emitted light.

In the preferred embodiment, the irradiation-light source is situated above the specimen holder 1. However, other schemes can be used to change the environment above the thin-film membrane 1A. For example, a solution-inflow device can be provided that flows a desired solution into the space above the thin-film membrane 1A surrounded by the support 1B, so that temperature changes in the specimen contacted by the solution can be detected.

The temperature profile of the specimen can be more rapidly measured by utilizing plural probes (e.g., two) operable to simultaneously contact-scan the second major surface of the thin-film membrane 1A. In such a scheme, the detection range for each probe is appropriately set so that each probe simultaneously contact-scans within the preset ranges for the probe.

With temperature-profile measurement apparatus and methods according to the present invention, a thin-film membrane made from a first thermo-electrically conductive member is formed on at least part of a specimen holder adapted to hold a specimen. The specimen is placed on the first major surface of the thin-film membrane. The second major surface, opposite the first major surface, of the thin-film membrane is contact-scanned with a probe. The probe is formed with a small tip radius of a second thermo-electrically conductive material that is different from the material used to form the thin-film membrane. The temperature profile of the specimen is measured by measuring the thermo-electromotive power (TEMF) generated between the thin-film membrane and the probe. Such a temperature profile can be determined with a high degree of resolution.

Whereas the invention has been described in connection with preferred embodiments and several alternative embodiments, it will be understood that the invention is not limited to those embodiments. On the contrary, the invention is intended to cover all alternatives, modifications, and equivalents as may be included within the spirit and scope of the invention as defined by the appended claims.

What is claimed is:

1. A method for obtaining a temperature profile of a specimen, the method comprising:
   (a) placing a specimen on a first major surface of a thin-film membrane made of a first thermo-electrically conductive material;
   (b) contact-scanning a second major surface, opposite the first major surface, of the thin-film membrane using a probe, the probe including a tip radius contacting the second major surface, the tip radius comprising a second thermo-electrically conductive material that is different from the first thermo-electrically conductive material so as to generate, by the Seebeck effect, a thermo-electromotive force between the tip radius and the thin-film membrane; and
   (c) measuring the thermo-electromotive force at plural locations on the second major surface corresponding to locations on the first major surface contacted by the specimen so as to obtain a temperature profile of the specimen.

2. The method of claim 1, further comprising the step of processing data, pertaining to the measured thermo-electromotive force, for display.

3. The method of claim 1, wherein the second major surface is contact-scanned in a raster manner.

4. An apparatus for obtaining a temperature profile of a specimen, the apparatus comprising:
   (a) a thin-film membrane formed of a first thermo-electrically conductive material, the thin-film membrane having a first major surface and a second major surface opposite the first major surface, the first major surface holding a specimen in contact with the first major surface;
   (b) a probe comprising a tip radius operable to contact the second major surface, the tip radius comprising a second thermo-electrically conductive material that is different from the first thermo-electrically conductive material so as to generate, by the Seebeck effect, a thermo-electromotive force between the tip radius and the thin-film membrane;

(c) a probe actuator operable to move the probe in a manner by which the tip radius scans across the second major surface; and (d) a TEMF measurement device connected to the thin-film membrane and to the tip radius, and wherein the TEMF measurement device measures the thermo-electromotive force, generated between the tip radius and the thin-film membrane, at multiple loci on the second major surface as the tip radius is scanned across the second major surface, the loci corresponding to locations on the first major surface contacted by the specimen so as to obtain a temperature profile of the specimen.

5. The apparatus of claim 4, further comprising an environment controller operable to differentially provide thermal energy to the specimen.

6. The apparatus of claim 5, wherein the environment controller comprises an irradiation light source.

7. The apparatus of claim 6, wherein the irradiation light source is operable to produce an illumination light of a wavelength that is differentially absorbed in a heat-generating manner by various structures of the specimen.

8. The apparatus of claim 4, further comprising a specimen holder defining a void spanned by the thin-film membrane.

9. The apparatus of claim 4, wherein the probe actuator is operable to scan the second major surface with the tip radius in a raster manner.

10. The apparatus of claim 4, further comprising a microcomputer connected to the TEMF-measurement device, the microcomputer being operable to process signals from the TEMF-measurement device for display.

11. The apparatus of claim 10, further comprising an actuator drive circuit connected to the probe actuator and to the microcomputer, the actuator drive circuit being operable to controllably move the probe according to electrical commands from the microcomputer.

12. The apparatus of claim 10, further comprising a display connected to the microcomputer, the display being operable to display the temperature profile of the specimen.

13. The apparatus of claim 4, wherein the first thermo-electrically conductive material is selected from a group consisting of nichrome, titanium, aluminum, and silicon.

14. An apparatus for measuring the temperature of a locus of a specimen, the apparatus comprising:

(a) a thin-film membrane formed of a first thermo-electrically conductive material, the thin-film membrane having a first major surface and a second major surface opposite the first major surface, the first major surface holding a specimen in contact with the first major surface;

(b) a probe comprising a tip radius operable to contact the second major surface, the tip radius comprising a second thermo-electrically conductive material that is different from the first thermo-electrically conductive material so as to generate, by the Seebeck effect, a thermo-electromotive force between the tip radius and the thin-film membrane; and (c) a TEMF measurement device connected to the thin-film membrane and to the tip radius, and wherein the TEMF measurement device measures the thermo-electromotive force, generated between the tip radius and the thin-film membrane, at a locus on the second major surface corresponding to a location on the first major surface contacted by the specimen so as to obtain a temperature of the locus of the specimen.

15. The apparatus of claim 14, further comprising an irradiation light source operable to direct a heat-generating light onto the specimen so as to differentially heat the specimen.

16. The apparatus of claim 14, wherein the probe is operable to be situated at any of various loci on the second major surface, corresponding to respective locations on the first major surface contacted by the specimen, sufficient to obtain a temperature measurement at each of the respective locations on the first major surface.

* * * * *